(12) United States Patent
Zhu et al.

(10) Patent No.: US 10,917,492 B2
(45) Date of Patent: Feb. 9, 2021

(54) WEB CACHING TECHNIQUES

(71) Applicant: WAL-MART STORES, INC., Bentonville, AR (US)

(72) Inventors: Linglong Zhu, San Francisco, CA (US); Wei Wang, Sunnyvale, CA (US); Zebin Chen, Santa Clara, CA (US); Ming Zhang, Milpitas, CA (US); Jufang Wang, San Jose, CA (US); Wenke Zhang, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 69 days.

(21) Appl. No.: 15/883,839

(22) Filed: Jan. 30, 2018

(65) Prior Publication Data

US 2019/0238652 A1    Aug. 1, 2019

(51) Int. Cl.
| | |
|---|---|
| *H04L 29/08* | (2006.01) |
| *G06F 12/0875* | (2016.01) |
| *H04L 29/06* | (2006.01) |

(52) U.S. Cl.
CPC ...... *H04L 67/2842* (2013.01); *G06F 12/0875* (2013.01); *H04L 67/02* (2013.01); *H04L 69/28* (2013.01); *G06F 2212/466* (2013.01)

(58) Field of Classification Search
CPC .................. G06F 16/9574; H04L 67/2842
See application file for complete search history.

(56) References Cited

U.S. PATENT DOCUMENTS

| | | | |
|---|---|---|---|
| 6,917,960 B1* | 7/2005 | Decasper | H04L 67/2847 709/203 |
| 7,584,418 B2* | 9/2009 | Subramanian | G06F 16/972 715/234 |
| 2009/0138817 A1* | 5/2009 | Oron | G06F 16/9577 715/788 |
| 2009/0177667 A1* | 7/2009 | Ramos | G06F 16/24539 |
| 2011/0040718 A1* | 2/2011 | Tendjoukian | H04L 67/2847 706/52 |

* cited by examiner

*Primary Examiner* — Andrew C Georgandellis
(74) *Attorney, Agent, or Firm* — Bryan Cave Leighton Paisner LLP

(57) ABSTRACT

This disclosure relates to systems and methods for executing a caching procedure for a web cache that is utilized by an electronic platform storing a plurality of clusters. The caching procedure may comprise retrieving a priming cutoff parameter that identifies a timeframe, utilizing the priming cutoff parameter to identify a subset of clusters that have been added or updated within the timeframe, and priming the web cache with content associated with the subset of clusters. The content in the web cache can be transmitted in response to receiving requests for the content. Other embodiments are disclosed herein.

20 Claims, 6 Drawing Sheets

500

510 – Utilizing a priming cutoff parameter to identify a subset of clusters which have been added or updated within a particular timeframe

↓

520 – For each cluster included in the subset of clusters, dividing the offerings included in the cluster into a plurality of groups

↓

530 – Specifying an ordering for the plurality of groups

↓

540 – Selecting a pre-determined number of the groups for each cluster included in the subset to be utilized in priming the web cache based on the ordering

↓

550 – Priming the web cache with content for the selected groups

400

410– Storing identification data that classifies offerings made available via an electronic platform into a plurality of clusters 420– Executing a web caching procedure configured to optimize a cache hit rate for a web cache that is utilized for the electronic platform 421– Retrieving a priming cutoff parameter that identifies a timeframe 422– Utilizing the priming cutoff parameter to identify a subset of the clusters which have been added or updated within the timeframe 423– Utilizing the identification data to retrieve content for the subset of the clusters 424– Priming the web cache with the content retrieved for the subset of clusters 430– Transmitting the content in the web cache over a network in response to receiving requests for the content

510— Utilizing a priming cutoff parameter to identify a subset of clusters which have been added or updated within a particular timeframe

520— For each cluster included in the subset of clusters, dividing the offerings included in the cluster into a plurality of groups

530— Specifying an ordering for the plurality of groups

540— Selecting a pre-determined number of the groups for each cluster included in the subset to be utilized in priming the web cache based on the ordering

550— Priming the web cache with content for the selected groups

FIG. 5

WEB CACHING TECHNIQUES

TECHNICAL FIELD

This disclosure relates generally to improved web caching techniques that can reduce latency, increase cache hit rates and enable cache priming procedures to be executed more frequently to ensure freshness of cached content.

BACKGROUND

In many situations, a conventional computer server is able to handle computer network demands associated with users accessing and interacting with a website hosted on the server (e.g., placing online orders, browsing product or service offerings and/or accessing online accounts). The conventional computer server may include a web cache to accelerate requests received from the users. However, in some situations, a conventional computer server is not sufficient to satisfy computer network demands even when using a web cache due to massive amounts of network traffic (e.g., due to thousands of users simultaneously accessing the website and/or placing orders via the website). In these situations, the conventional computer server can be overloaded, thus causing server lag and delays in processing network requests. In severe cases, the conventional computer server can even crash and cease to function.

BRIEF DESCRIPTION OF THE DRAWINGS

To facilitate further description of the embodiments, the following drawings are provided in which:

FIG. 4 is a flowchart for a method according to certain embodiments;

FIG. 5 is a flowchart for a method according to certain embodiments; and

Figure 1:
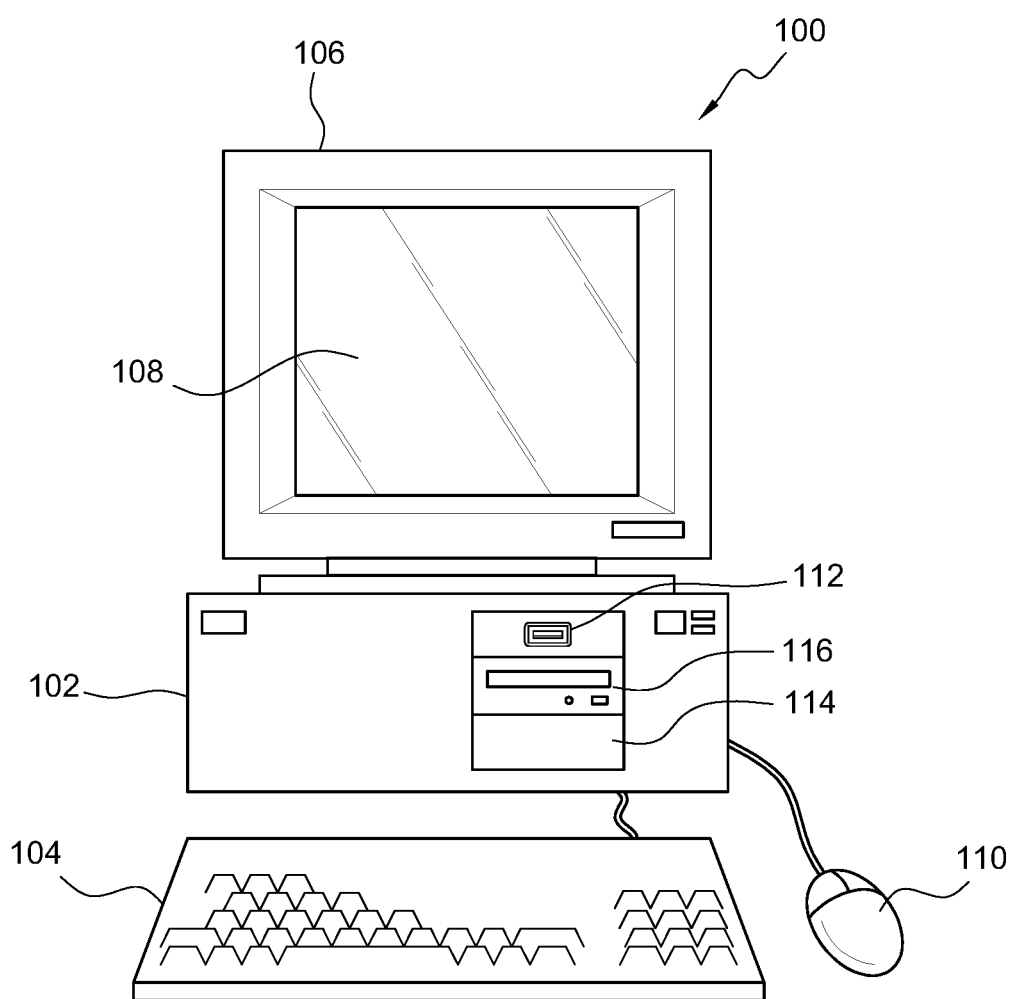
FIG. 1 illustrates a front elevational view of a computer system that is suitable for implementing various embodiments of the systems disclosed in FIGS. 3 and 6.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Figure 2:
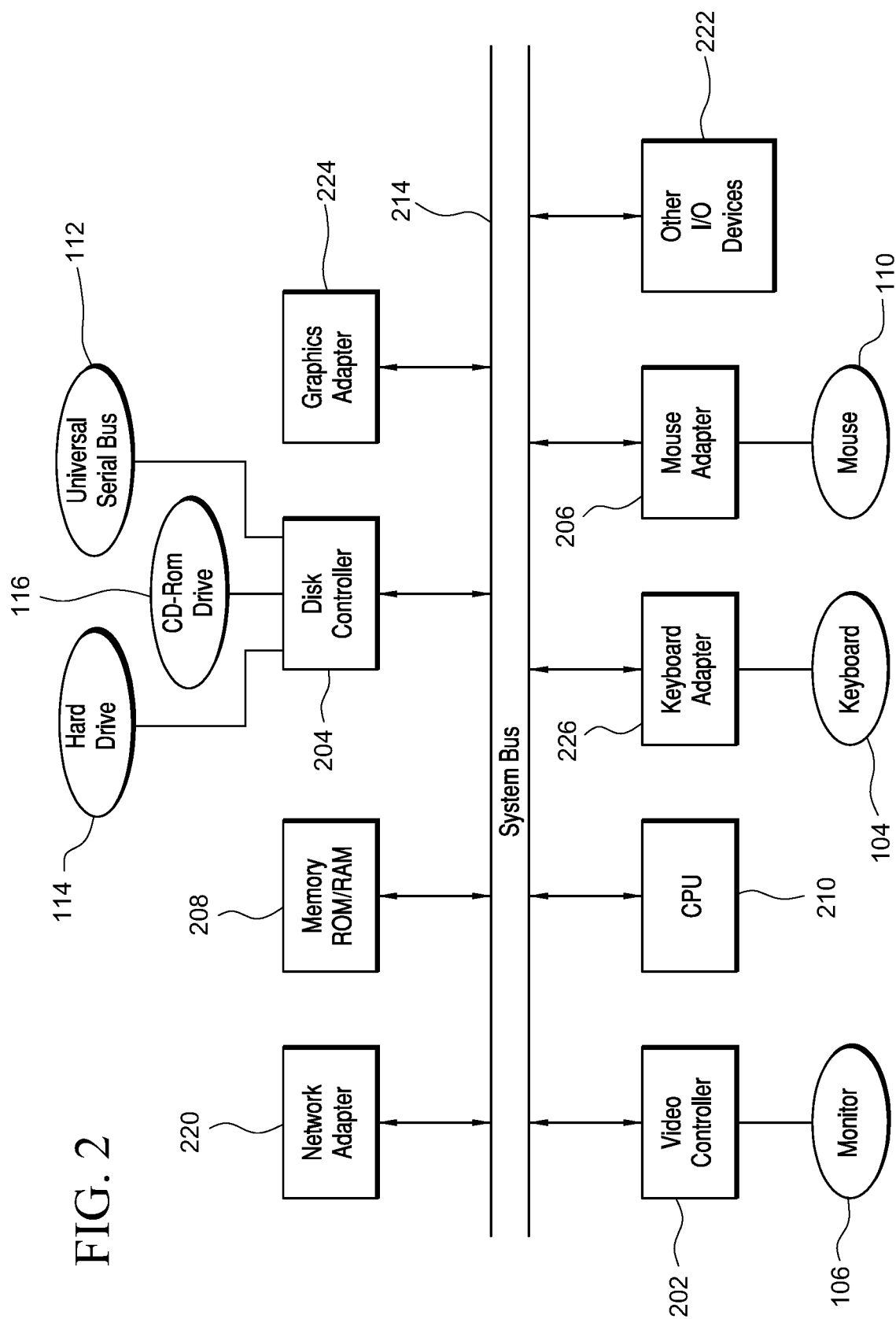
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
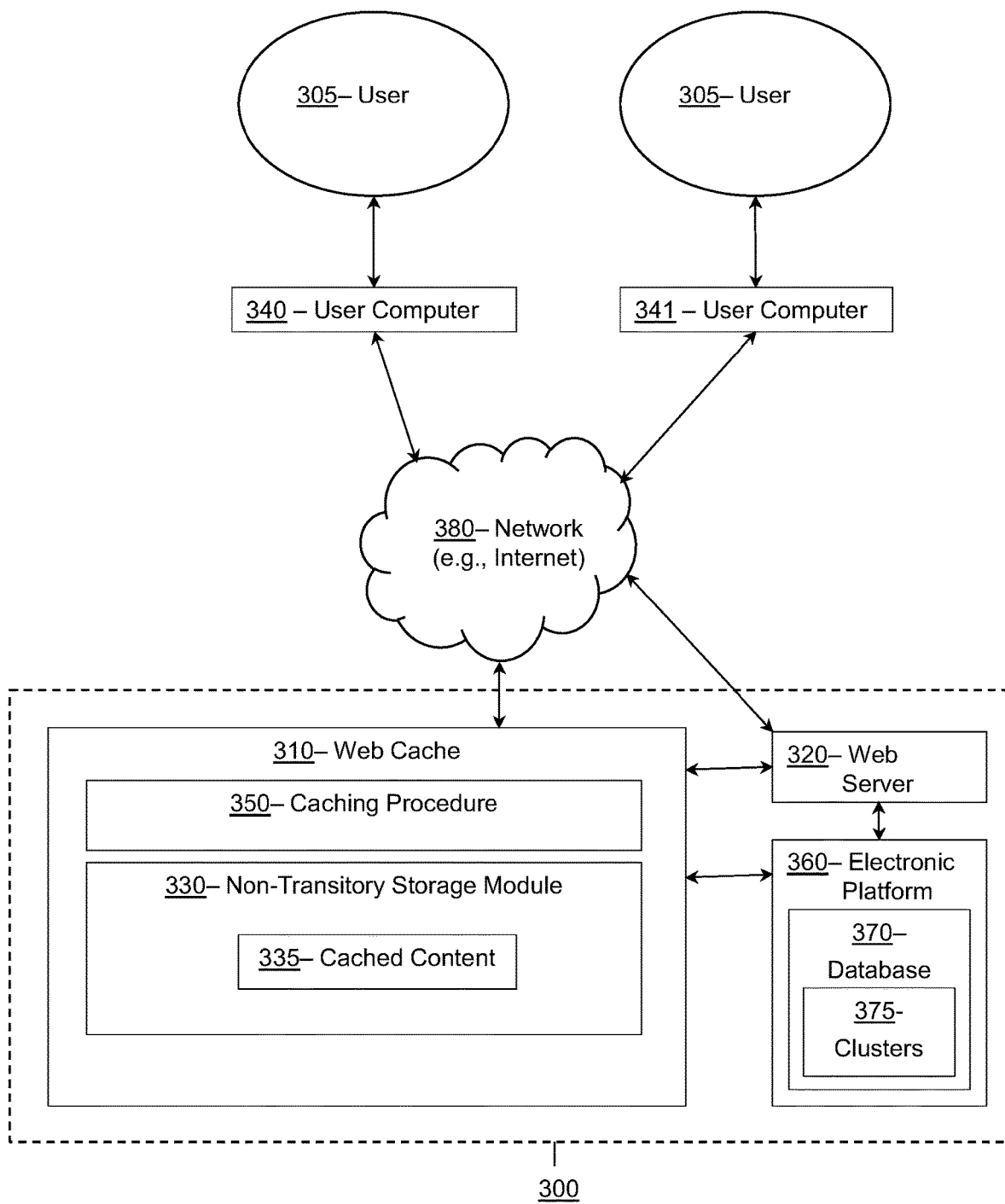
FIG. 3 illustrates a representative block diagram of a system, according to an embodiment.

Turning ahead in the drawings, FIG. 3 illustrates a block diagram of a system 300 that can be employed for caching and delivering electronic content as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web cache 310, a web server 320, and an electronic platform 360, each of which can be a computer system, such as computer system 100 (FIG. 1), as described above, and can each be a single computer, a single server, or a cluster or collection of computers or servers, or a cloud of computers or servers. In other embodiments, a single computer system can host two or more of the web cache 310, the web server 320, and the electronic platform 360. Additional details regarding the web cache 310, the web server 320, and the electronic platform 360 are described herein.

In many embodiments, system 300 also can comprise user computers 340, 341. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For example, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 and/or web cache 110 can be in data communication through a network 380 (e.g., the Internet) with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an online shopping website via an electronic platform 360 that allows users to browse and/or search for products, to add products to an electronic shopping cart, and/or to purchase products, in addition to other suitable activities.

In many embodiments, the web cache 310, the web server 320, and the electronic platform 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) associated with the web cache 310, the web server 320, and the electronic platform 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of the web cache 310, the web server 320, and the electronic platform 360. In a similar manner, the processing module(s) and the memory storage module(s) can be local and/or remote to each other.

In many embodiments, the web cache 310, the web server 320, and/or the electronic platform 360 can be configured to communicate with one or more user computers 340 and 341. In some embodiments, user computers 340 and 341 also can be referred to as customer computers. In some embodiments, the web cache 310, the web server 320, and/or the electronic platform 360 can communicate or interface (e.g., interact) with one or more customer computers (such as user computers 340 and 341) through a network 380, e.g., such as the Internet. Network 380 can be an intranet that is not open to the public. Accordingly, in many embodiments, the web cache 310, the web server 320, and/or the electronic platform 360 (and/or the software used by such systems) can refer to a back end of system 300 operated by an operator and/or administrator of system 300, and user computers 340 and 341 (and/or the software used by such systems) can refer to a front end of system 300 used by one or more users 305, respectively. In some embodiments, users 305 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, the web cache 310, the web server 320, and/or the electronic platform 360 also can be configured to communicate with one or more databases (e.g., such as database 370). The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication among the web cache 310, the web server 320, and/or the electronic platform 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

A number of embodiments described herein can include a system. The system can include one or more processing modules and one or more non-transitory storage modules storing computing instructions configured to run on the one or more processing modules. The one or more storage modules can be configured to run on the one or more processing modules and perform the acts of: executing a caching procedure for a web cache that is utilized by an electronic platform that stores a plurality of clusters; and transmitting the content in the web cache in response to receiving requests for the content. The caching procedure can comprise: retrieving a priming cutoff parameter that identifies a timeframe; utilizing the priming cutoff parameter to identify a subset of clusters selected from the plurality of clusters that have been added or updated within the timeframe; and priming the web cache with content associated with the subset of clusters identified using the priming cutoff parameter. In some embodiments, the caching procedure can be configured to optimize a cache hit rate for the web cache.

Various other embodiments described herein include a method. The method can include executing, with one or more processing modules, a caching procedure for a web cache that is utilized by an electronic platform that stores a plurality of clusters, and transmitting the content in the web cache in response to receiving requests for the content. The caching procedure can comprise: retrieving a priming cutoff parameter that identifies a timeframe; utilizing the priming cutoff parameter to identify a subset of clusters selected from the plurality of clusters that have been added or updated within the timeframe; and priming the web cache with content associated with the subset of clusters identified using the priming cutoff parameter. In some embodiments, the caching procedure can be configured to optimize a cache hit rate for the web cache.

In certain embodiments, the electronic platform 360 is configured to provide a website for an online retailer or online shopping site that enables users 305 to browse offerings (e.g., products and/or services), place orders, make purchases, access online accounts, and perform other related activities over the network 380. The electronic platform 360 includes a database 370 that stores information associated with the products and/or services, and organizes the products and/or services into a plurality of clusters 375. Generally speaking, the clusters 375 can represent any grouping of products and/or services. In certain embodiments, each cluster 375 can represent a specific grouping of products and/or services that are associated with a particular promotion or sale. For example, a first cluster 375 can represent a grouping of products that are being offered in connection with a Black Friday sale, a second cluster 375 can represent a grouping of products that are being offered in connection with a Valentine's Day sale, a third cluster 375 can represent a grouping of products that are being offered in connection with a Christmas sale, and a fourth cluster 375 can represent a grouping of products that are being offered in connection with a special 1-day sale.

When a user 305 accesses the website hosted by the electronic platform 360, the electronic platform 360 can display products and/or services associated with one or more clusters 375. Before doing so, the electronic platform 360 can submit a query to the database 370 to identify and retrieve information associated with the products and/or services included in the cluster 375. In certain embodiments, each cluster 375 is assigned a unique identifier (ID), and each of the products and services is also assigned unique IDs. When the electronic platform 360 receives a request to display products and/or services associated with a cluster 375, the electronic platform 360 queries the database 375 using the IDs to retrieve the associated content.

Once the query is satisfied, the electronic platform 360 can transmit the information for display on a user computer 340, 341 operated by the user 305. In many cases, the clusters 375 can include large numbers (e.g., hundreds or thousands) of products and/or services. As a result, the electronic platform 360 can divide the products and/or services included in the cluster 375 into different groups. A subset of the products and/or services can initially be displayed on an interface to the user 305, and the interface provided to the user can include selectable options for navigating to other web pages that display the other products and/or services.

When large volumes of users access the electronic platform 360 simultaneously (e.g., to place orders or browse offerings via the website), this situation can cause the servers (e.g., web server(s) 320) hosting the electronic platform 360 to become overloaded, which can then result in server lag and delays in processing requests. In more severe cases, the servers can crash entirely, causing the website to become inaccessible. These problems are caused, at least in part, by the servers being unable to process the queries associated with displaying the clusters 375 to the users 305.

While a web cache can assist with overcoming these problems to some extent, conventional web cache systems do not work well in situations where the electronic platform 360 is constantly updating or adding clusters 375. Priming or pre-loading the web cache can be expensive in terms of time and processing. However, failing to prime the web cache can result in stale information being provided to the users 305 (e.g., when an old version of a cluster 375 is transmitted by the web cache, rather than an updated version of the cluster 375) and decreased cache hit rates (e.g., when new ones of clusters 375 are not loaded into the web cache).

To overcome the above-described obstacles, the principles discussed herein utilize novel web caching techniques that significantly increase the cache hit rate, reduce server latency, and permit the web cache 310 to be primed or updated more frequently. More specifically, a web cache 350 executes a novel caching procedure 350 that primes or pre-loads the web cache 350 with information associated with the clusters 375 in a unique manner, as described in further detail below. The information from the electronic platform 360 (e.g., such as the clusters 375 and other information in the database 370) is pre-loaded and stored as cached content 335 in a non-transitory storage module 330 of the web cache 310. Despite the fact that the electronic platform 360 stores a large number of clusters 375 (each of which includes a large number of products and/or services), the caching procedure 350 enables the cached content 335 to be refreshed frequently with the most relevant content. Testing results have shown that the novel web caching techniques described herein can improve the cache hit ratio by more than 20% (from 70.5% using conventional caching techniques to 91.6% using the techniques described herein) and can reduce the average server latency by more than half (from 63 milliseconds to 24 milliseconds).

As mentioned above, one challenge with designing an appropriate caching procedure 350 is that the content of the web cache must be constantly refreshed (e.g., every 15 minutes or less). However, priming or pre-loading the web cache 310 with updated cached content 335 can be very expensive in terms of time and processing. For example, the priming procedure may involve querying the database 370 using the unique IDs assigned to the clusters 375, products and services, and retrieving the content associated with the query for loading into the web cache 310. When there are large numbers of clusters 375, it is not possible to prime the web cache in a timely fashion. The amount of time it takes to prime the web cache 310 exceeds the amount of time desired to update the content pre-loaded into the web cache 310. Another concern is that when there are a large number of clusters 375, the volume of requests to prime the web cache will greatly increase the processing load on web server 320, and impact its ability to respond to the requests from the users 305.

To address the above-described problems, the caching procedure 350 utilizes a priming cutoff parameter to reduce the number of clusters 375 that are loaded into the web cache 310. The priming cutoff parameter identifies a timeframe or window of time. Content associated with clusters 375 that have not been updated or added on the electronic platform 360 within the timeframe specified by the priming cutoff parameter are not loaded into the web cache 310, and content for any of the clusters 375 that have been updated or added in the timeframe are loaded into the web cache 310. For example, if the priming cutoff parameter is set to 90 days, clusters 375 that have been updated or added within the previous 90 days would be pre-loaded as cached content 335, while clusters that have not been updated or added with the previous 90 days would not be pre-loaded. Other time periods can be used, as well.

The selection of the priming cutoff parameter can be based on an analysis of traffic on the electronic platform 360. Data logs that include records of network traffic and activities on the electronic platform 360 can be analyzed to detect patterns which indicate when clusters 375 tend to become stale such that they are no longer requested by users 305 or requested at much lower rates. In certain embodiments, this analysis can be automatically performed by the system 300 (e.g., by the web cache 310 and/or electronic platform 360) to select an optimal timeframe. In other embodiments, this analysis can be performed manually by an individual reviewing the data logs. During testing, it was found that setting the priming cutoff parameter to 90 days was optimal for the electronic platform 360 that was the subject of the test. The analysis revealed that 95% of all traffic was directed to clusters 375 that have been updated or added within the previous 90 days. Also, the number of clusters 375 that were primed was reduced by 80%. However, it should be recognized that the optimal priming cutoff parameter for other platforms may differ based on the configuration of the electronic platform 360 and/or the traffic patterns for the electronic platform 360. Any appropriate timeframe may be utilized for the priming cutoff parameter.

In certain embodiments, the caching procedure 350 may further reduce the expenses and time associated with priming the web cache 310 by loading only a subset of each of the clusters 375 that fall within the timeframe identified by the priming cutoff parameter. As explained above, because a cluster 375 can have a large number (e.g., hundreds or thousands) of products and/or services, the products and/or services can be divided into different groups when they are displayed on web pages to users 305, and the users 305 can select options (e.g., hyperlinks) to navigate among the different web pages to browse the products and/or services included in the cluster 375. For example, a first web page interface can display information for products 1-50, a second web page interface can display information for products 51-100, a third web page interface can display information for products 101-150, etc. In certain embodiments, in order to further reduce the time and processing required for priming the web cache 310, the caching procedure 350 loads only a subset of the cluster that includes products and/or services that are listed on the first three web pages for the cluster. This procedure is effective is because requests for later pages (e.g., web pages four, five, six, etc. for the cluster) are less likely to be made by users 305, and are typically not necessary to load into the web cache 310. In other embodiments, the subset of the cluster loaded via caching procedure 350 has a different number of web pages for the cluster, such as only the first web page for the cluster, only the first two web pages for the cluster, or only the first four web pages for the cluster. When clusters 375 include very large numbers of products and/or services, the priming procedure can be significantly shortened by not loading the entire cluster 375 into the web cache 310. Furthermore, in some embodiments, even if a cluster is updated or added within the timeframe specified by the priming cutoff parameter, the subset of the cluster does not need to be loaded via caching procedure 350 if the content of the web pages within the subset of the cluster have not changed (i.e., the cluster was updated because only content of web pages after the sixth web page for the cluster were changed while the subset of the cluster contains only the first two web pages for the cluster).

As evidenced by the disclosure herein, the principles set forth in the disclosure are rooted in computer technologies that overcome existing problems in known web caching systems, specifically problems dealing with the server latency, low cache hit rates and efficiently priming and refreshing web caches. Known web caching systems cannot perform the priming procedure within a reasonable amount of time when there are large amounts of data on an electronic platform, while keeping the cache hit rates to an acceptable level. The principles described in this disclosure provide a technical solution (e.g., one that utilizes novel web caching procedures) for overcoming such problems. This technology-based solution marks an improvement over existing computing capabilities and functionalities related to web caching systems by improving cache hit rates and decreasing server latency. The novel web cache systems are designed to improve the way web servers store, retrieve and transmit data in memory devices.

Figure 6:
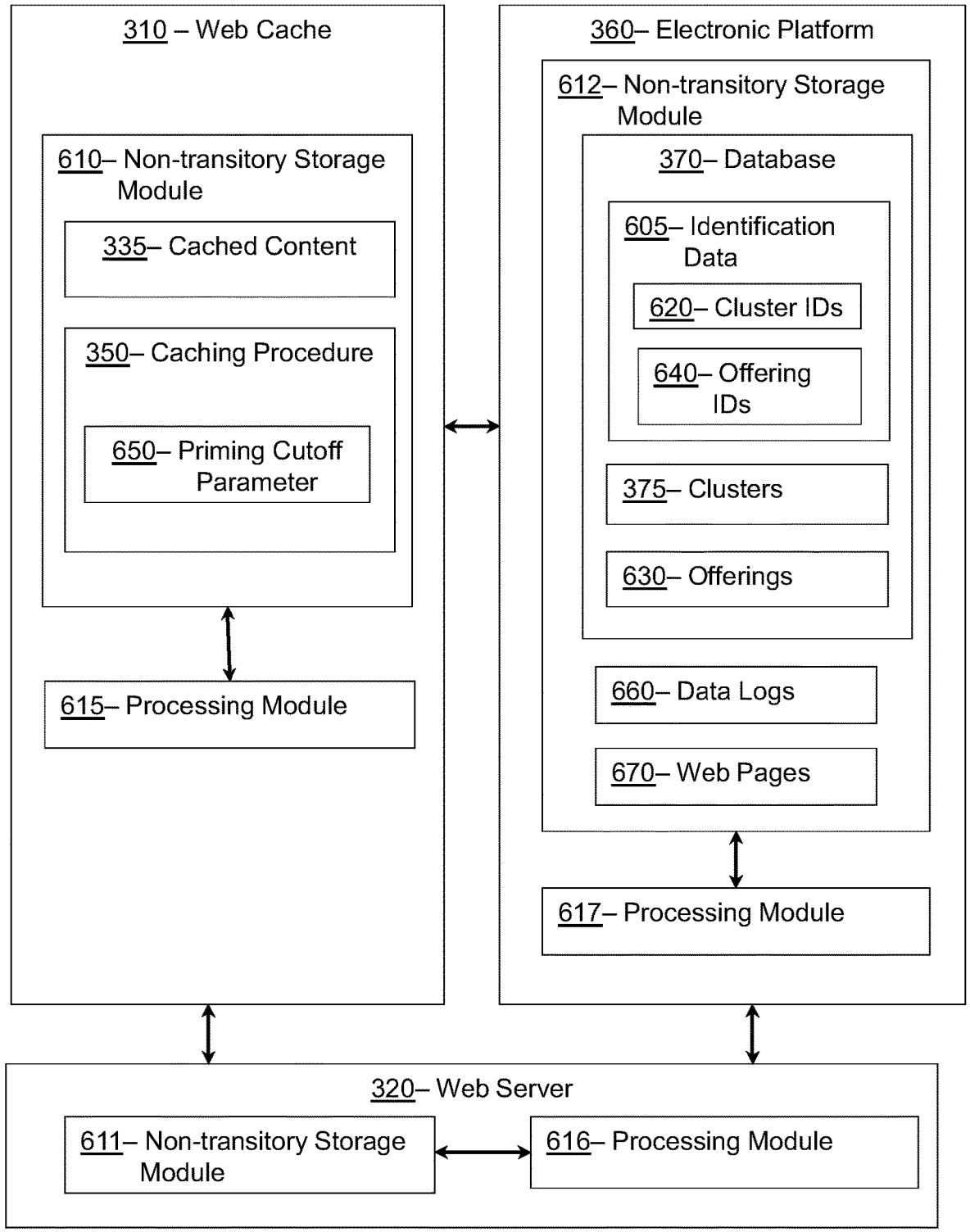
FIG. 6 illustrates a representative block diagram of a portion of the system of FIG. 3, according to an embodiment.

Turning ahead in the drawings, FIG. 4 illustrates a flow chart for a method 400 according to certain embodiments of the principles disclosed herein. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 610, 611, 612 (FIG. 6) and/or 330 (FIG. 3). Such non-transitory memory storage modules can be part of a computer system such as web cache 310 (FIGS. 3 & 6), web server 320 (FIGS. 3 & 6), and/or electronic platform 360 (FIGS. 3 & 6). The processing module(s) can be similar or identical to the processing module(s) described above with respect to computer system 100 (FIG. 1).

Method 400 can comprise an activity 410 of storing identification data 605 (FIG. 6) that classifies offerings 630 (FIG. 6) made available via the electronic platform 360 (FIGS. 3 & 6) into the plurality of clusters 375 (FIGS. 3 & 6). The offerings 630 (FIG. 6) can relate to products and/or services made available via the electronic platform 360 (FIGS. 3 & 6). The identification data 605 (FIG. 6) can include any type of information associated with classifying the offerings 630 (FIG. 6). In certain embodiments, the identification data 605 (FIG. 6) includes cluster IDs 620 (FIG. 6) that uniquely identify each of the clusters 375 (FIGS. 3 & 6), and offering IDs 640 (FIG. 6) that uniquely identify the offerings 630 (FIG. 6). Each offering ID 640 (FIG. 6) can be associated with one or more cluster ID 620 (FIG. 6) to associate the offering with the cluster.

Method 400 can further comprise an activity 420 of executing a caching procedure 350 (FIGS. 3 & 6) for a web cache 310 (FIGS. 3 & 6) that is utilized by the electronic platform 360 (FIGS. 3 & 6). In some embodiments, caching procedure 350 can be configured to optimize a cache hit rate for web cache 310. Activity 420 can comprise sub-activities 421, 422, 423 and 424. Sub-activity 421 can comprise an activity of retrieving a priming cutoff parameter 650 (FIG. 6) that identifies a timeframe. Sub-activity 422 can comprise an activity of utilizing the priming cutoff parameter 650 (FIG. 6) to identify a subset of the clusters 375 (FIGS. 3 & 6) that have been added or updated within the timeframe. Sub-activity 423 can comprise an activity of utilizing the identification data 605 (FIG. 6) to retrieve content for the subset of the clusters 375 (FIGS. 3 & 6). Sub-activity 424 can comprise an activity of priming the web cache 310 (FIGS. 3 & 6) with the content retrieved for the subset of clusters 375 (FIGS. 3 & 6).

Method 400 can further comprise an activity 430 of transmitting the content 335 (FIGS. 3 & 6) in the web cache over a network 380 (FIG. 3) in response to receiving requests for the content. For example, the cached content 335 (FIGS. 3 & 6) stored in the web cache 310 (FIGS. 3 & 6) can be transmitted over a network 380 (FIG. 3), which includes the Internet, to one or more user computers 340, 341 (FIG. 3) in response to one or more users 305 (FIG. 3) accessing the electronic platform 360 (FIGS. 3 & 6) to browse through or purchase products and/or services associated with the clusters (FIGS. 3 & 6), and/or in response to users 305 (FIG. 3) requesting web pages 670 (FIG. 6) comprising the content 335 (FIGS. 3 & 6).

Turning to the next drawing, FIG. 5 illustrates a flow chart for a method 500 according to certain embodiments of the principles disclosed herein. Method 500 is merely exemplary and is not limited to the embodiments presented herein. Method 500 can be employed in many different embodiments or examples not specifically depicted or described herein. In some embodiments, the activities of method 500 can be performed in the order presented. In other embodiments, the activities of method 500 can be performed in any suitable order. In still other embodiments, one or more of the activities of method 500 can be combined or skipped. In many embodiments, system 300 (FIG. 3) can be suitable to perform method 500 and/or one or more of the activities of method 500. In these or other embodiments, one or more of the activities of method 500 can be implemented as one or more computer instructions configured to run at one or more processing modules and configured to be stored at one or more non-transitory memory storage modules 610, 611, 612 (FIG. 6) and/or 330 (FIG. 3). Such non-transitory memory storage modules can be part of a computer system such as web cache 310 (FIGS. 3 & 6), web server 320 (FIGS. 3 & 6), and/or electronic platform 360 (FIGS. 3 & 6). The processing module(s) can be similar or identical to the processing module(s) described above with respect to computer system 100 (FIG. 1).

Method 500 can comprise an activity 510 of utilizing a priming cutoff parameter 650 (FIG. 6) to identify a subset of clusters 375 (FIGS. 3 & 6) that have been added or updated within a particular timeframe. The timeframe can represent any time period (e.g., any amount of minutes, hours, days, weeks or months). As mentioned above, the timeframe can be set to 90 days in certain embodiments. Any clusters that have been added or updated within the previous 90 days can be included in the subset. Other time periods can be used, as well.

Method 500 can further comprise an activity 520 of, for each cluster 375 (FIGS. 3 & 6) included in the subset of clusters, dividing the offerings 630 (FIG. 6) included in the cluster into a plurality of groups. For example, as explained above, this activity can include dividing the offerings 630 (FIG. 6) into groups for display on separate web pages 670 (FIG. 6) that can be transmitted to the users 305 (FIG. 3).

Method 500 can further comprise an activity 530 of specifying an ordering for the plurality of groups. The ordering can represent the order in which the web pages 670 (FIG. 6) are numbered based on the groupings. For example, when a cluster 375 (FIGS. 3 & 6) is presented to a user 305, a first group of products (e.g., products 1-10) can be presented. The web page 670 (FIG. 6) that presents the first group of products can include hyperlinks or other options for viewing other groups of offerings, e.g., for viewing products 11-20 on a second web page 670 (FIG. 6), products 21-30 on a third web page 670 (FIG. 6), products 31-40 on a fourth web page 670 (FIG. 6), etc. Thus, the groups can be ordered in this manner.

Method 500 can further comprise an activity 540 of selecting a pre-determined number of the groups for each cluster 375 (FIGS. 3 & 6) included in the subset to be utilized in priming the web cache 310 (FIGS. 3 & 6) based on the ordering. For example, in certain embodiments, the caching procedure 350 (FIGS. 3 & 6) can specify that only the first three groups (e.g., in the above example, comprising products 1-10, products 11-20, and products 21-30) of each cluster 375 (FIGS. 3 & 6) should be selected.

Method 500 can further comprise an activity 550 of priming the web cache 310 (FIGS. 3 & 6) with content for the selected groups. The cached content 335 (FIGS. 3 & 6) can then be rapidly transmitted to user computers 340, 341 (FIG. 3) upon request.

The procedures described above in FIGS. 4 and 5 can be applied to select the optimal content to be utilized in priming the web cache 310 (FIGS. 3 & 6). Using these techniques to select the content which is cached enables the web cache 310 to be continuously updated, while maintaining high cache hit rates and low latency.

Turning to the last drawing, FIG. 6 illustrates a block diagram of a portion of system 300 comprising a web cache 310, a web server 320, and an electronic platform 360, according to the embodiment shown in FIG. 3. Each of the web cache 310, web server 320, and electronic platform 360, is merely exemplary and not limited to the embodiments presented herein. Each of the web cache 310, web server 320, and electronic platform 360, can be employed in many different embodiments or examples not specifically depicted or described herein. In some embodiments, certain elements or modules of the web cache 310, web server 320, and electronic platform 360, can perform various procedures, processes, and/or acts. In other embodiments, the procedures, processes, and/or acts can be performed by other suitable elements or modules.

It should be noted that each of the web cache 310, web server 320, and electronic platform 360 can be implemented in software, hardware or a combination of both. For example, the web cache 310 can be implemented as a hardware-based caching application and/or a computer program. Thus, regardless of the particular implementation shown in FIG. 6 (as well as other figures), the principles described herein should not be construed as limiting to either a hardware or software based implementation.

As shown therein, the web cache 310, web server 320, and electronic platform 360 can each include one or more non-transitory storage modules and one or more processing modules. For example, web cache 310, web server 320, and electronic platform 360 can comprise non-transitory storage modules 610, 611, and 612, respectively, and processing modules 615, 616, and 617, respectively. In the exemplary embodiment shown in FIG. 6, the non-transitory storage module 612 associated with the electronic platform 360 comprises a database 370. The database 370 stores identification data 605, clusters 375 and offerings 630. As mentioned above, an offering 630 can generally represent any type of product and/or service. The clusters 375 can generally represent any grouping of the offerings 630 (e.g., a grouping that includes one or more products or services). The identification data 605 can represent any type of data or information that is used to associate the offerings 630 with the clusters 375. The identification data 605 can include cluster IDs 620 that unique identify each cluster 375, and offering IDs 640 that uniquely identify each offering 630. The identification data 605 can further include data that correlates the cluster IDs 620 with the offering IDs 640 for determining which offerings 630 are included in which clusters 375.

The data logs 660 stored on the electronic platform 360 can generally include any information associated with requests for accessing the electronic platform 360, the web server 320 and/or the web cache 310. For example, the data logs 660 can comprise web server logs that maintain a history of web page 670 requests and/or requests to view data associated with the clusters 375 and offerings 630. As explained above, the data logs 660 can be utilized to select an optimal priming cutoff parameter 650. The optimal priming cutoff parameter 650 can include a date or timeframe that indicates when clusters 375 (and/or their associated web pages 670) tend to become stale such that their likelihood of being requested is significantly reduced.

The web cache 310 executes a caching procedure 350 that reduces the amount of content stored in the cached content 335, and that can select the content to be cached in an optimal manner based on its likelihood of being requested. This allows the web cache 310 be to be primed more frequently, while both increasing the cache hit rate and lowering latency associated with fulfilling requests.

Although systems and methods for caching web content have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIGS. 4 and 5 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory storage computer-readable media storing computing instructions configured to run on the one or more processors and perform:
executing a caching procedure for a web cache that is utilized by an electronic platform, wherein the electronic platform stores content items belonging to a plurality of clusters, wherein each cluster of the plurality of clusters comprises respective content items associated with a grouping of different product offerings, the caching procedure comprising:
automatically selecting a priming cutoff parameter by analyzing records of network activity of a plurality of users to detect patterns of requests from the plurality of users for the content items belonging to the plurality of clusters, wherein the priming cutoff parameter identifies a timeframe of multiple timeframes selected based on the patterns of requests;
utilizing the priming cutoff parameter to identify a subset of clusters of the plurality of clusters that have been added to the electronic platform or updated within the timeframe of the multiple timeframes; and
for each cluster of the subset of clusters, as identified, priming the web cache with a portion of the respective content items belonging to the each cluster of the subset of clusters, wherein the portion is selected based on a specified ordering of the respective content items belonging to the each cluster of the subset of clusters; and
transmitting the portion of the respective content items in the web cache in response to receiving requests for the respective content items.

2. The system of claim 1, wherein the caching procedure further comprises:
for the each cluster of the subset of clusters, separating respective product offerings included in the each cluster of the subset of clusters into a plurality of groups.

3. The system of claim 2, wherein each group of the plurality of groups identifies the respective product offerings presented together on a respective web page that is displayed on a computing device operated by a user.

4. The system of claim 1, wherein the electronic platform stores identification data that classifies respective product offerings made available via the electronic platform into the plurality of clusters.

5. The system of claim 4, wherein the identification data includes respective unique cluster identifiers (IDs) for each of the plurality of clusters and respective unique product offering IDs for each of the respective product offerings; and
wherein the respective unique cluster IDs and the respective unique product offering IDs are utilized to associate the respective product offerings with one or more of the plurality of clusters.

6. The system of claim 5, wherein the caching procedure primes the web cache by:
pre-computing queries that utilize the respective unique cluster IDs and the respective unique product offering IDs to retrieve the respective content items for the respective product offerings included in the subset of clusters; and
pre-loading the respective content items into the web cache.

7. The system of claim 1, wherein the patterns of requests are associated with the requests received simultaneously with each other, and wherein the requests comprise accessing or viewing the plurality of clusters.

8. The system of claim 7, wherein the priming cutoff parameter is further utilized to identify clusters included in the plurality of clusters that are being requested as a result of being added or updated within the timeframe.

9. The system of claim 8, wherein:
the priming cutoff parameter is further utilized to predict when the clusters included in the plurality of clusters are stale; and
any clusters included in the plurality of clusters that are predicted to be stale are not pre-loaded into the web cache.

10. The system of claim 1, wherein:
the caching procedure further comprises:
for the each cluster of the subset of clusters, separating respective product offerings included in the each cluster of the subset of clusters into a plurality of groups;
the patterns of requests are associated with the requests received simultaneously, and wherein the requests comprise accessing or viewing the plurality of clusters.

11. A method comprising:
executing, with one or more processors, a caching procedure for a web cache that is utilized by an electronic platform, wherein the electronic platform stores content items belonging to a plurality of clusters, wherein each cluster of the plurality of clusters comprises respective content items associated with a grouping of different product offerings, the caching procedure comprising:
automatically selecting a priming cutoff parameter by analyzing records of network activity of a plurality of users to detect patterns of requests from the plurality of users for the content items belonging to the plurality of clusters, wherein the priming cutoff parameter identifies a timeframe of multiple timeframes selected based on the patterns of requests;
utilizing the priming cutoff parameter to identify a subset of clusters of the plurality of clusters that have been added to the electronic platform or updated within the timeframe of the multiple timeframes; and
for each cluster of the subset of clusters, as identified, priming the web cache with a portion of the respective content items belonging to the each cluster of the subset of clusters, wherein the portion is selected based on a specified ordering of the respective content items belonging to the each cluster of the subset of clusters; and
transmitting the portion of the respective content items in the web cache in response to receiving requests for the respective content items.

12. The method of claim 11, wherein the caching procedure further comprises:
for the each cluster of the subset of clusters, separating respective product offerings included in the each cluster of the subset of clusters into a plurality of groups.

13. The method of claim 12, wherein each group of the plurality of groups identifies the respective product offerings presented together on a respective web page that is displayed on a computing device operated by a user.

14. The method of claim 11, wherein the electronic platform stores identification data that classifies respective product offerings made available via the electronic platform into the plurality of clusters.

15. The method of claim 14, wherein the identification data includes respective unique cluster identifiers (IDs) for each of the plurality of clusters and respective unique product offering IDs for each of the respective product offerings; and
wherein the respective unique cluster IDs and the respective unique product offering IDs are utilized to associate the respective product offerings with one or more of the plurality of clusters.

16. The method of claim 15, wherein the caching procedure primes the web cache by:
pre-computing queries that utilize the respective unique cluster IDs and the respective unique product offering IDs to retrieve the respective content items for the respective product offerings included in the subset of clusters; and pre-loading the respective content items into the web cache.

17. The method of claim 11, wherein the patterns of requests are associated with the requests received simultaneously with each other, and wherein the requests comprise accessing or viewing the plurality of clusters.

18. The method of claim 17, wherein the priming cutoff parameter is further utilized to identify clusters included in the plurality of clusters that are being requested as a result of being added or updated within the timeframe.

19. The method of claim 18, wherein:

the priming cutoff parameter is further utilized to predict when the clusters included in the plurality of clusters are stale; and any clusters included in the plurality of clusters that are predicted to be stale are not pre-loaded into the web cache.

20. The method of claim 11, wherein:

the caching procedure further comprises:

for the each cluster of the subset of clusters, separating respective product offerings included in the each cluster of the subset of clusters into a plurality of groups; and the patterns of requests are associated with the requests received simultaneously, and wherein the requests comprise accessing or viewing the plurality of clusters.

* * * * *